United States Patent [19]

Smith

[11] 4,419,857
[45] Dec. 13, 1983

[54] LAWN MOWER WITH COMBINED ENGINE BRAKE AND IGNITION CONTROL

[75] Inventor: LaVerne D. Smith, Wataga, Ill.

[73] Assignee: Outboard Marine Corporation, Waukegan, Ill.

[21] Appl. No.: 291,013

[22] Filed: Aug. 7, 1981

[51] Int. Cl.³ .................. A01D 69/10; F16D 23/00
[52] U.S. Cl. ............................... 56/11.3; 56/10.8; 192/1
[58] Field of Search .............. 56/11.3, 10.5, 10.8; 192/1, 3 S, 3 M, 2

[56] References Cited

U.S. PATENT DOCUMENTS

| | | | |
|---|---|---|---|
| 2,287,199 | 6/1942 | Schick | 192/3 R |
| 2,969,130 | 1/1961 | Logan | 192/2 |
| 3,290,871 | 12/1966 | Haas | 56/10.5 |
| 3,664,390 | 5/1972 | Mattson et al. | 192/3 R |
| 3,708,046 | 1/1973 | Brown | 192/2 |
| 4,035,994 | 7/1977 | Hoff | 192/3 M |

Primary Examiner—Gene Mancene
Assistant Examiner—John Weiss
Attorney, Agent, or Firm—Michael, Best & Friedrich

[57] ABSTRACT

Disclosed herein is a rotary lawn mower comprising a housing supported for rotation along the ground, an engine mounted on the housing and including a rotatably mounted crankshaft, a cutter blade located in the housing and fixed to the crankshaft, a braking surface located on the crankshaft and having common rotation therewith, a brake arm supported for movement relative to the engine between a braking position and a non-braking position, which brake arm has thereon a brake surface which is engageable with the braking surface when the brake arm is in the braking position, a spring biasing the brake arm toward the braking position, an actuating linkage for moving the brake arm into the non-braking position against the action of the brake arm biasing spring, and a lost motion connection between the brake arm and the actuating linkage.

8 Claims, 2 Drawing Figures

U.S. Patent
Dec. 13, 1983
4,419,857
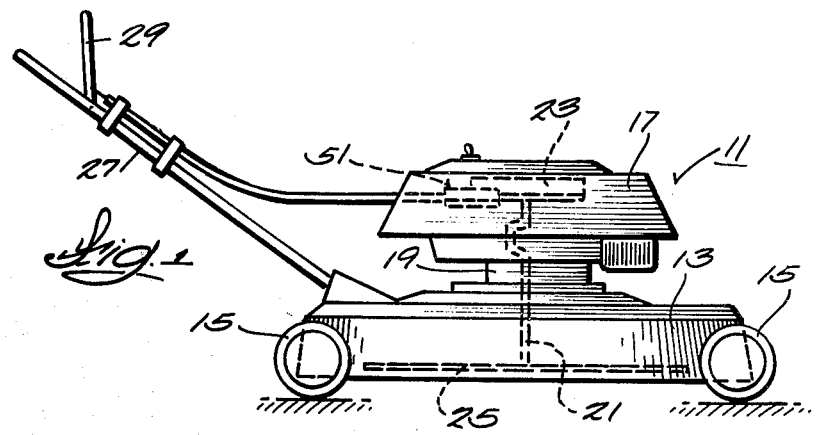
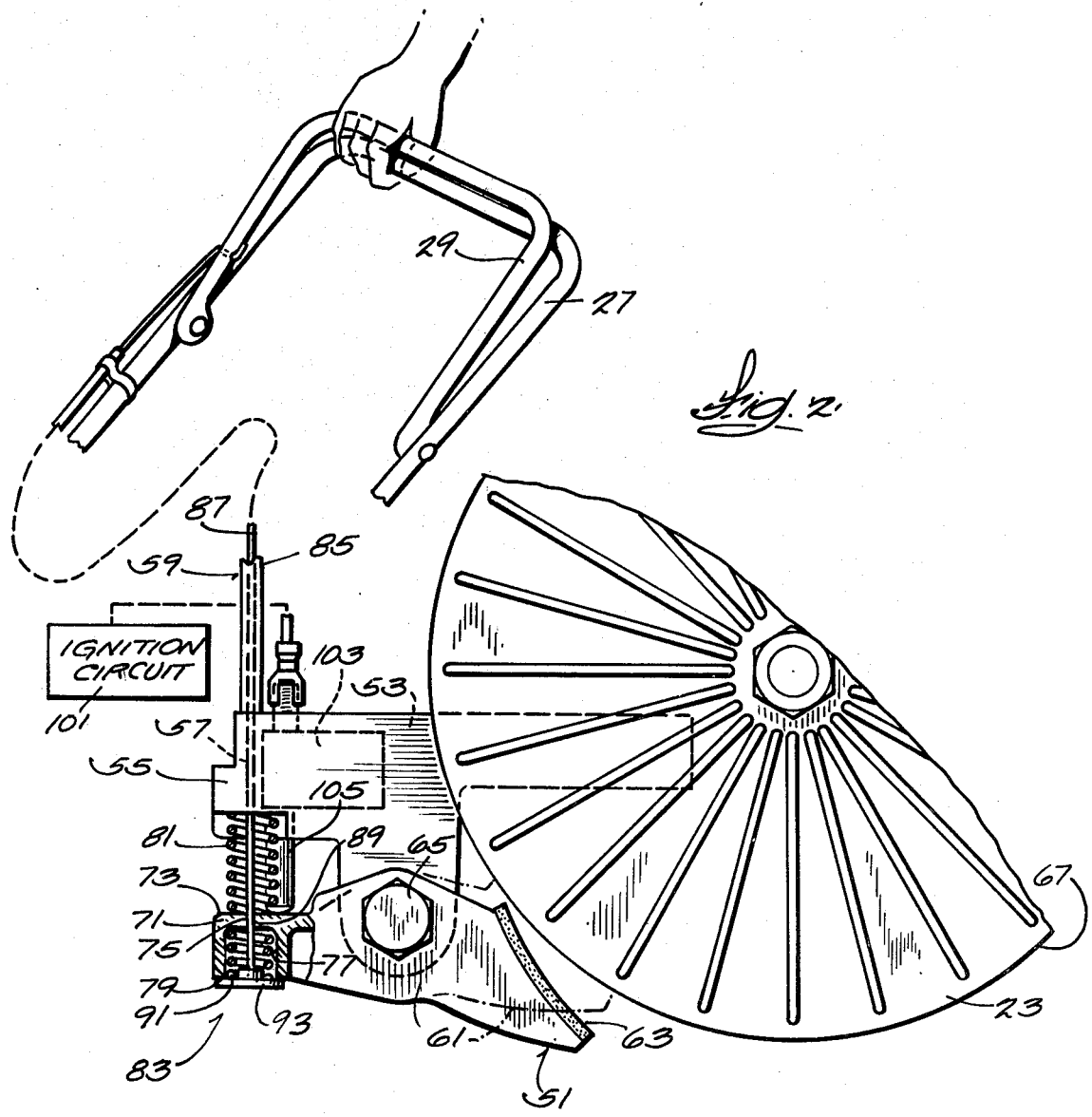

LAWN MOWER WITH COMBINED ENGINE BRAKE AND IGNITION CONTROL

BACKGROUND OF THE INVENTION

The invention relates generally to rotary lawn mowers and, more particularly, to arrangements for rapidly braking cutter blade rotation upon release of a "dead man" control, notwithstanding wear which may have occured between the braking components due to previous braking operation.

The invention also relates to arrangements for rapidly braking engine rotation upon release of an actuating linkage, which arrangement automatically compensates for wear of the braking components.

Attention is directed to the lawn mower disclosed in the Coates U.S. Pat. No. 3,228,177, issued Jan. 11, 1966. It is noted that Coates fails to teach or suggest any lost motion connection which is self-adjusting for wear of the braking components.

Attention is also directed to the Haas U.S. Pat. No. 3,290,871, issued Dec. 13, 1966, which discloses a lawn mower including a brake band engageable with a flywheel.

Attention is also directed to the Hoff U.S. Pat. No. 4,035,994, issued July 19, 1977, and directed to a lawn mower blade control apparatus.

SUMMARY OF THE INVENTION

The invention provides a rotary lawn mower comprising a housing supported for rotation along the ground, an engine mounted on the housing and including a rotatably mounted crankshaft, a cutter blade located in the housing and fixed to the crankshaft, a braking surface located on the crankshaft and having common rotation therewith, a brake arm supported for movement relative to the engine between a braking position and a non-braking position, which brake arm has thereon a brake surface which is engageable with the braking surface when the brake arm is in the braking position, means biasing the brake arm toward the braking position, and means connected to the brake arm for moving the brake arm into the non-braking position against the action of the brake arm biasing means and including an actuating linkage having a lost motion connection with the brake arm.

In one embodiment in accordance with the invention, the lawn mower further includes switch means fixed relative to the brake arm, connected to the engine, an operable in response to brake arm movement so as to deactivate the engine when the brake arm is in the braking position and so as to enable activation when the brake arm is in the non-braking position.

In one embodiment in accordance with the invention, brake arm has therein an aperture, the actuating linkage comprises a flexible cable including an outer end portion having an end, which outer end portion passes through the aperture, and the actuating linkage further includes means preventing withdrawal of the outer end portion of the cable through the aperture, which withdrawal preventing means and lost motion connection comprises a spring having a first end connected to the end of the cable outer end portion, surrounding the outer end portion of the cable, and having a second end bearing against the brake arm.

In one embodiment in accordance with the invention, the brake arm includes a recess aligned with the aperture in the brake arm, having an outer end, and receiving the second end of the spring, and the actuating linkage further includes a washer fixed to the end of the cable outer end portion, engaging the first end of the spring, and being spaced from the brake arm recess outer end when the brake arm is in the braking position and being engageable with the outer end of the brake arm recess so as to displace the brake arm, against the action of the brake arm biasing means, toward the non-braking position in response to displacement of the cable in the direction of withdrawal of the cable outer end portion from the brake arm aperture.

In one embodiment in accordance with the invention, the lawn mower further includes a mounting bracket fixed to the engine and including therein an aperture, and the brake arm is pivotally mounted on the mounting bracket and includes therein an aperture in general alignment with the aperture in the mounting bracket, the actuating linkage comprises a flexible cable which extends through the apertures in the brake arm and in the mounting bracket, and the brake arm biasing means comprises a helical spring encircling the cable, having one end bearing against the brake arm, and having a second end bearing against the mounting bracket.

In one embodiment in accordance with the invention, the lawn mower further includes a handle extending from the housing and the actuating linkage also includes a control lever movably mounted on the handle and connected to the cable for displacement between a position adjacent the handle when the brake arm is in the non-braking position and a position spaced from the handle when the brake arm is in the braking position.

The invention also provides an engine comprising a rotatably mounted crankshaft, a braking surface located on the crankshaft and having common rotation therewith, a brake arm supported for movement relative to the crankshaft between a braking position and a non-braking position, which brake arm has thereon a brake surface which is engageable with the braking surface when the brake arm is in the braking position, means biasing the brake arm toward the braking position, and means connected to the brake arm for moving said brake arm into the non-braking position against the action of the brake arm biasing means and including an actuating linkage having a lost motion connection with the brake arm.

Other features and advantages of the embodiments of the invention will become known by reference to the following general description, claims and appended drawings.

IN THE DRAWINGS

FIG. 1 is a perspective view of a lawn mower embodying various of the features of the invention.

FIG. 2 is a partially schematic fragmentary plan view, partially broken away and in section, of various of the components of the lawn mower shown in FIG. 1.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 of the drawing is a rotary lawn mower 11 which can be self propelled or of the push type and which includes a blade housing 13 supported for travel over the ground by a plurality of wheels 15. Mounted on top of the housing 13 is a prime mover, such as an internal combustion engine 17, which engine 17 includes an engine block 19, and a crankshaft 21 which is rotatably mounted in the engine block, which has fixed thereon a flywheel 23 located above the housing 13, which passes through the top of the housing 13, and which has fixed thereon within the housing 13 a cutter blade 25.

Extending upwardly and rearwardly from the housing 13 is a handle 27 affording guidance for movement in the lawn mower 11. Movably mounted on the handle 27 is a lever 29 which controls engine ignition and operation of a brake mechanism 51.

More particularly, the brake mechanism 51 comprises a mounting or supporting bracket 53 which can be suitably formed, which is suitable fixedly mounted on the engine block 19, and which includes a boss 55 having therein an aperture 57 through which passes an operating cable 59 still to be described.

Movably mounted on the mounting or supporting bracket 53 is a brake arm 61 which includes a brake surface 63 in the form of a friction pad. While other constructions could be employed, in the preferred and illustrated construction, the brake arm is carried on the mounting or supporting bracket 53 by a shoulder bolt 65 for pivotal movement relative thereto and for movement between a non-braking position (See FIG. 2) wherein the brake surface 63 is spaced from a peripheral braking surface 67 on the flywheel 23 and a braking position (See FIG. 2) wherein the brake surface 63 engages the peripheral surface 67 on the flywheel 23 to prevent rotary movement thereof. While it is preferred that the brake surface 63 engage the flywheel surface 67, the brake surface 63 could be arranged to engage other surfaces rotatably driven by the crankshaft 21.

The brake arm 61 also includes an extending portion 71 which includes a shoulder or surface 73 spaced from the boss 55 on the mounting or supporting bracket 53, which includes an aperture 75 opening into the shoulder or surface 73 in general alignment with the aperture 57 in the mounting or support bracket 53, and which includes a recess 77 opening in the direction away from the mounting bracket boss 55 and including an outer end or surface 79.

Means are provided for biasing the brake arm 61 to the braking position. While various arrangements can be employed, in the preferred and illustrated construction, a helical compression spring 81 is employed, which spring 81 bears, at one end, against the boss 55 of the mounting bracket 53 and which, at the other end, bears against the shoulder or surface 73 of the brake arm 61.

Means are connected to the brake arm 61 for displacing the brake arm 61, against the action of the biasing spring 81, toward the non-braking position. While various other arrangements can be employed, the preferred and illustrated construction includes an actuating linkage 83 comprising the before mentioned flexible push-pull cable 59 which includes an outer sheath 85 and an inner core 87 displacable in the outer sheath 85 and having a first end connected to the control lever 29 and having an outer end portion 89 which includes a second end and which extendes through the aperture 57 in the mounting bracket 53, through the biasing spring 81 to assure retention thereof in proper position, and through the aperture 75 in the brake arm 61. At its second end, the inner core 87 is connected to the brake arm 61 by means preventing withdrawal of the cable inner core 87 from the brake arm aperture 75 and for affording lost motion between the cable inner core 87 and the brake arm 61.

While various arrangements can be employed for connecting the outer end portion of the cable inner core 87 to the brake arm 61, in the preferred and illustrated construction a lost motion helical compression spring 91 is at least partially received in the recess 77, bears, at one end, against the bottom of the recess 77 in the brake arm 61 and, at the other end, bears against a retaining member in the form of a washer 93 which is suitable fixed to the end of the outer end portion 89 of the cable inner core 87. When the inner core 87 is displaced in the direction of withdrawal of the inner core 87 from the aperture 75 in the brake arm 61, i.e., upwardly in FIG. 2, and after lost motion between the inner core 87 and the brake arm 61, the washer 93 engages the outer surface or end 79 of the recess 77 to prevent such withdrawal and to displace the brake arm 61, in accordance with inner core movement.

Means are provided for interrupting engine ignition and therefore deactivating the engine when the brake arm 61 is in the brake position and for permitting engine ignition and thereby affording or enabling engine operation or activation when the brake arm 61 is in the non-braking position. While other arrangements can be employed, in the preferred and illustrated construction, the engine includes a schematically illustrated ignition circuit 101 incorporating an ignition switch 103 which controls engine operation, which is suitably mounted on the mounting bracket 51, as by being frictionally received in a suitably formed recess, or otherwise, and which includes a spring biased plunger 105 engaged with the portion 71 of the brake arm 61 and operative by movement of the brake arm 61. The switch 103 can be either a grounding switch which grounds the circuit 101 and thereby deactivates the engine 17 upon closure thereof or a circuit interrupting switch which opens the circuit 101 to prevent ignition upon opening thereof.

In operation, the brake arm biasing spring 81 normally serves to locate the brake arm 61 in the braking position, thereby braking engine rotation, disabling the engine ignition circuit 101, and spacing the control lever 29 from the handle 27. However, displacement of the lever 29 by the operator to a position in closely adjacent relation to the handle 27 serves, initially, to engage the washer 93 with the brake arm 61 and, then, to displace the brake arm 61 from the braking position to the non-braking position, thereby permitting engine rotation and engine ignition. The provision of the lost motion spring 91 permits self-adjustment by the brake arm biasing spring 81 for wear which may occur to the brake surfaces 63 and 67 and insures reliable braking engagement, notwithstanding such wear. The simultaneous engine deactivation and braking is intended to obtain rapid cessation of cutter blade rotation.

Various of the features of the invention are set forth in the following claims.

I claim:

1. A rotary lawn mower comprising a housing supported for rotation along the ground, an engine mounted on said housing and including a rotatably mounted crankshaft, a cutter blade located in said housing and fixed to said crankshaft, a braking surface located on said crankshaft and having common rotation therewith, a brake arm supported for movement relative to said engine between a braking position and a non-braking position, said brake arm having therein an aperture and having thereon a brake surface which is engageable with said braking surface when said brake arm is in said braking position, means biasing said brake arm toward said braking position, and means connected to said brake arm for moving said brake arm into said non-braking position against the action of the said brake arm biasing means and including an actuating linkage having a lost motion connection with said brake arm, said actuating linkage comprising a flexible cable including an outer end portion having an end, which outer end portion passes through said aperture, and said actuating linkage further including means preventing withdrawal of said outer end portion of said cable through said aperture, said withdrawal preventing means and said lost motion connection comprising a spring having a first end connected to said end of said cable outer end portion, surrounding said outer end portion of said cable and having a second end bearing against said brake arm.

2. A rotary lawn mower in accordance with claim 1 wherein said brake arm includes a recess aligned with said aperture in said brake arm, having an outer end, and receiving said second end of said spring, and wherein said actuating linkage further includes a washer fixed to said end of said cable outer end portion, engaging said first end of said spring, and being spaced from said brake arm recess outer end when said brake arm is in said braking position and being engageable with said outer end of said brake arm recess so as to displace said brake arm, against the action of said brake arm biasing means, toward said non-braking position in response to displacement of said cable in the direction of withdrawal of said cable outer end portion from said brake arm aperture.

3. A rotary lawn mower comprising a housing supported for rotation along the ground, an engine mounted on said housing and including a rotatably mounted crankshaft, a cutter blade located in said housing and fixed to said crankshaft, a braking surface located on said crankshaft and having common rotation therewith, a mounting bracket fixed to said engine and including therein an aperture, a brake arm pivotally mounted on said mounting bracket for movement relative to said engine between a braking position and a non-braking position, said brake arm having therein an aperture in general alignment with said aperture in said mounting bracket, said brake arm also having thereon a brake surface which is engagable with said braking surface when said brake arm is in said braking position, a helical spring biasing said brake arm toward said braking position and including one end bearing against said brake arm and a second end bearing against said mounting bracket, and means connected to said brake arm for moving said brake arm into said non-braking position against the action of the said biasing spring and including an actuating linkage having a lost motion connection with said brake arm and comprising a flexible cable which extends through said apertures in said brake arm and in said mounting bracket, and through said helical spring.

4. A rotary lawn mower in accordance with claim 3 and further including a handle extending from said housing and wherein said actuating linkage also includes a control lever movably mounted on said handle and connected to said cable for displacement between a position adjacent said handle when said brake arm is in said non-braking position and a position spaced from said handle when said brake arm is in said braking position.

5. A rotary lawn mower in accordance with claim 1 and further including switch means fixed relative to said brake arm, connected to said engine, and operable in response to brake arm movement so as to deactivate said engine when said brake arm is in said braking position and so as to enable engine activation when said brake arm is in said non-braking position.

6. A rotary lawn mower comprising a housing supported for rotation along the ground, an engine mounted on said housing and including a rotatably mounted crankshaft and a flywheel having hereon a braking surface, a cutter blade located in said housing and fixed to said crankshaft, a mounting bracket fixed relative to said engine and including therein an aperture, a brake arm mounted on said mounting bracket for pivotal movement relative thereto between a braking position and a non-braking position, said brake arm having therein an aperture in general alignment with said aperture in said mounting bracket, said brake arm also having thereon a brake surface which is engageable with said braking surface when said brake arm is said braking position, and said brake arm also including a recess aligned with said brake arm aperture, a helical biasing spring having one end bearing against said brake arm, having a second end bearing against said mounting bracket, and biasing said brake arm toward said braking position, an actuating linkage connected to said brake arm for moving said brake arm into said non-braking position against the action of said brake arm biasing spring and including a flexible cable including an outer end portion having an end, said outer end portion extending through said aperture in said mounting bracket, through said brake arm biasing spring, and through said aperture in said brake arm, a helical spring having a first end received in and bearing against said recess, encircling said outer end portion of said cable, and having a second end, and a retaining member fixed to said end of said cable outer end portion, being spaced from said outer end of said recess when said brake arm is in said braking position, and being engageable with said recess outer end to displace said brake arm, against the action of said brake arm biasing spring, from said non-braking position in response to displacement of said cable in the direction of withdrawal of said cable outer end portion from said brake arm aperture, and switch means fixed relative to said brake arm, connected to said engine, and operable in response to brake arm movement so as to deactivate said engine when said brake arm is in said braking position and so as to enable activation of said engine when said brake arm is in said non-braking position.

7. A rotary lawn mower in accordance with claim 6 and further including a handle extending from said housing and wherein said actuating linkage also includes a control lever movably mounted on said handle and connected to said cable for displacement between a position adjacent said handle when said brake arm is in said non-braking position and a position spaced from said handle when said brake arm is in said braking position.

8. An engine comprising a rotatably mounted crankshaft, a flywheel fixed on said crankshaft and having thereon a braking surface, a mounting bracket fixed relative to said engine and including therein an aperture, a brake arm mounted on said mounting bracket for pivotal movement relative thereto between a braking position and a non-braking position, said brake arm having therein an aperture in general alignment with said aperture in said bracket, said brake arm also having thereon a brake surface which is engageable with said braking surface when said brake arm is in said braking position, and said brake arm also including a recess aligned with said brake arm aperture, a helical biasing spring having one end bearing against said brake arm, having a second end bearing against said mounting bracket, and biasing said brake arm toward said braking position, an actuating linkage connected to said brake arm for moving said brake arm into said non-braking position against the action of said brake arm biasing spring and including a flexible cable including an outer end portion having an end, said outer end portion extending through said aperture in said bracket, through said brake arm biasing spring, and through said aperture in said brake arm, a helical spring having a first end received in and bearing against said recess, encircling said outer end portion of said cable, and having a second end, and a retaining member fixed to said end of said cable outer end portion, being spaced from said outer end of said recess when said brake arm is in said braking position, and being engageable with said recess outer end to displace said brake arm, against the action of said brake arm biasing spring, from said non-braking position in response to displacement of said cable in the direction of withdrawal of said cable outer end portion from said brake arm aperture, and switch means fixed relative to said brake arm, connected to said engine, and operable in response to brake arm movement so as to deactivate said engine when said brake arm is in said braking position and so as to enable activation of said engine when said brake arm is in said non-braking position.

* * * * *